Aug. 4, 1970  B. R. HALL ET AL  3,523,246
METHOD OF AND APPARATUS FOR TESTING A LAMINAR MATERIAL
FOR IRREGULARITIES OF THICKNESS
Filed July 22, 1968  4 Sheets-Sheet 1

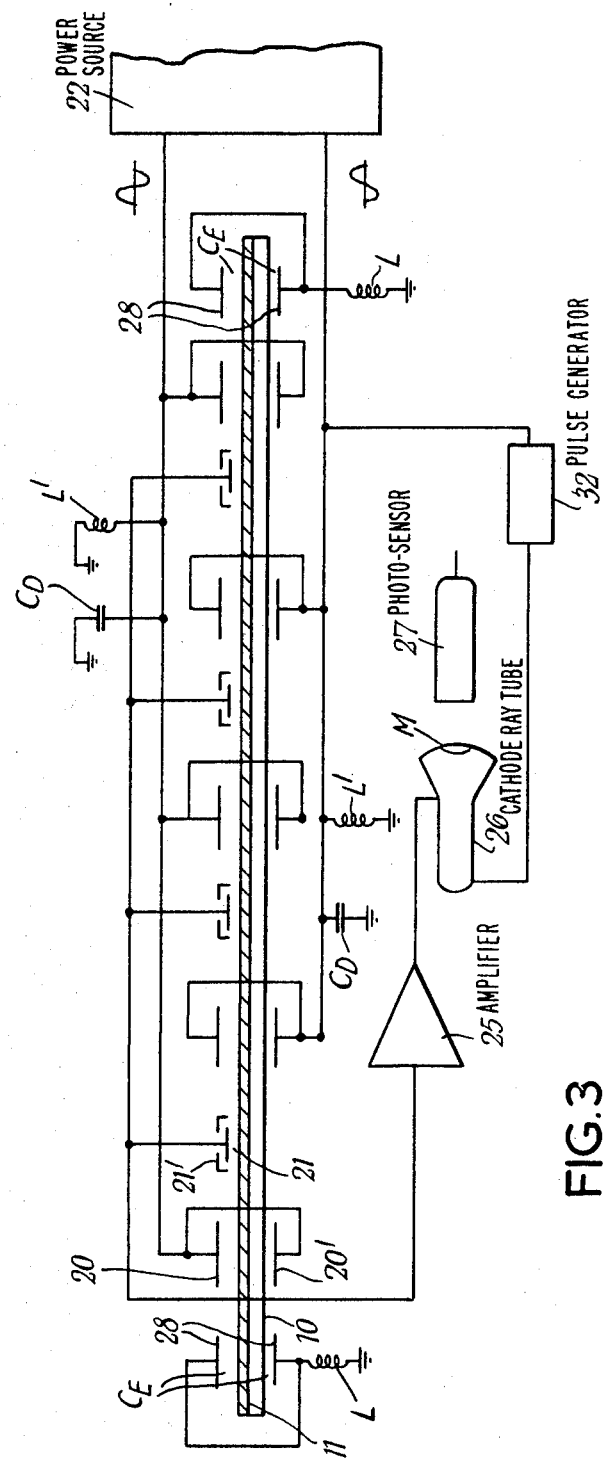

United States Patent Office 3,523,246
Patented Aug. 4, 1970

3,523,246
METHOD OF AND APPARATUS FOR TESTING A LAMINAR MATERIAL FOR IRREGULARITIES OF THICKNESS
Brian Reginald Hall and Denis Manktelow Neale, both of 23 Roden St., Ilford, Essex, England
Continuation-in-part of abandoned application Ser. No. 545,608, Apr. 27, 1966. This application July 22, 1968, Ser. No. 746,460
Claims priority, application Great Britain, Apr. 27, 1965, 17,689/65
Int. Cl. G01r 27/26
U.S. Cl. 324—61
18 Claims

ABSTRACT OF THE DISCLOSURE

Apparatus for testing a moving laminar material for irregularities in thickness, comprises a first and second set of electrodes, rollers for moving the material between the electrodes and an amplifying circuit. Each set of electrodes includes a pair of drive electrodes situated adjacent positions in the laminar material, which are spaced apart in the plane of the material. An alternating potential difference is connected to the drive electrodes to induce an alternating current in the surface of the material. A probe electrode situated between the two drive electrodes is responsive to changes in the alternating potential of the material between the drive electrodes. The detected signal is amplified and gives an indication of the presence of thickness irregularities in the material. The first set of electrodes, extending substantially transverse to the direction of travel of the material, detects transverse irregularities and the second set of electrodes, which are reciprocated transverse to the direction of travel, detect longitudinal irregularities.

---

This invention relates to an improved method of and apparatus for testing materials for irregularities of thickness, and is a continuation-in-part of application Ser. No. 545,608 filed Apr. 27, 1966, now abandoned.

It has been known in the past to determine a characteristic of a moving sheet by running it between electrodes. The characteristics which have been determined in the past have been moisture content or surface flaws, and have employed the principle of detecting a change in capactiy of a capacitance through which the sheet passes. This method of detecting flaws in sheets is somewhat unsatisfactory due to lack of sensitivity.

According to the present invention therefore in one aspect thereof there is provided a method of testing laminar material for irregularities of thickness, said laminar material being at least partly conductive of electricity comprising applying an alternating potential difference between two positions which are spaced apart and parallel to the plane of the laminar material to induce an alternating electric field in the material between said two positions, detecting changes in the alternating potential at a predetermined position in the material intermediate said two positions and deducing therefrom the presence of irregularities of thickness between said two positions.

Preferably the said potential difference is applied, and/or said changes in potential are detected, by respective electrodes which are capacitively coupled with said material without making physical contact therewith.

The apparatus is particularly useful where the material is a coating on a laminar sheet, for example the emulsion coating on a photographic film. By employing capacitive coupling the uniformity of thickness of the coating can be tested while the coating is still wet, without damaging the coating by physical contact.

In another aspect, the present invention provides apparatus for testing laminar material for irregularities of thickness said laminar material being at least partly conductive of electricity comprising a pair of drive electrodes disposed at two positions which are spaced apart and parallel to the plane of the laminar material, means for mounting said material adjacent said drive electrodes, means for applying an alternating potential difference between said drive electrodes to induce an alternating electric potential in the surface of the material between said two positions, a probe electrode disposed at a position intermediate the said two positions and responsive to changes in said alternating field in the material at said intermediate position, and indicating means connected to the probe electrode whereby said changes in the alternating potential provide an indication of the presence of thickness irregularities of said material between said two spaced apart positions.

Preferably the said drive electrodes and the probe electrode are fixed relatively to one another. Equal alternating voltages of opposite phase are preferably applied at the said two position and the said intermediate position is preferably located substantially midway between said two positions.

In a preferred embodiment the drive electrodes are elongated and parallel to each other, each having a length greater tha nthe distance separating them.

Each drive electrode is preferably connected to earth through an inductance so chosen that it resonates with the capacitance between the said electrode and earth at the frequency of the applied alternating potential difference.

Means may be provided in one embodiment for moving laminar material to be gauged continuously relative to said electrodes, the drive electrodes extending substantially perpendicularly to the direction of travel of the material. In another embodiment means may be provided for reciprocating the electrodes relative to the laminar material, the said drive electrodes extending substantially perpendicularly to the direction of reciprocation. In the latter case the electrodes are preferably adapted to be reciprocated with an amplitude substantially equal to half the separation of the drive electrodes. Apparatus according to the invention may employ separate sets of drive and probe electrodes arranged in accordance with each of these embodiments.

In constructions employing the second of the embodiments referred to above, there is preferably provided an electrode array comprising a plurality of adjacent pairs of parallel drive electrodes, a probe electrode being disposed between each respective pair of drive electrodes, each drive electrode, with the exception of the two extreme drive electrodes of the array, being common to two of said pairs of drive electrodes. Beyond said extreme drive electrodes is provided at each end of said array an additional electrode which is electrically connected to earth potential and is capacitively coupled to the material the thickness of which is under test. The earth connection of each said additional electrode may be taken through an inductance the impedance of which at the frequency of the applied alternating voltage is substantialy equal to the impedance presented by the capacitive coupling between said additional electrode and the material. Preferably said connection is made through an impedance connected to the output of a phase-inverting voltage amplifier, the input of which is connected to auxiliary probe electrodes disposed to respond to alternating potentials induced in that part of the matetrial opposite said additional drive electrodes.

A screening electrode is preferably disposed adjacent each probe electrode on the side of said probe electrode remote from the laminar material and means are provided for applying to each screen electrode an alternating potential which is substantially equal in phase and magnitude to the potental induced in the respective probe electrode by the laminar material, thereby improving the ability of said electrode to assume the alternating potential of the laminar material opposite said probe electrode. In addition said screen electrode screens the/or each probe electrode on the side remote from the laminar material from other sources of alternating potential. This measure is a known technique and is described by Howard L. Danials, "Tubeless Probe for V.T.V.M." Electronics, February 1945, p. 125. An incidental advantage of the use of said probe electrode screen(s) is that movement of the laminar material in the direction of its thickness produces less variation in the alternating potential induced in the probe electrode.

In one construction of the apparatus each drive electrode comprises two electrically connected parallel plates adapted to be disposed on opposite sides of the material. This measure assists in reducing the adverse effect which movement (e.g. due to vibration) of the laminar material under test in the direction of its thickness has on the field induced in the material and therefore the potential induced in the/or each probe electrode.

An alternative, or additional, measure to reduce this adverse effect involves connecting the/or each probe electrode to a phase-sensitive detector which is adapted to be sensitive to changes in the alternating potential of said probe due to non-uniformity of thickness of the material and therefore is relatively insensitive to changes in said potential due to changes in the coupling capacitance between the material and the respective drive electrodes.

Any convenient means may be employed to display the probe electrode potential and thus provide an indication of the degree of non-uniformity of the thickness of the material. In a preferred arrangement, the/or each probe electrode is connected through amplifier means to a beam-deflecting circuit of a cathode ray tube to produce deflections on the tube display representative of the non-uniformity of the thickness of the material.

The cathode ray tube display is preferably associated with photo-electric sensing means which is adapted to produce an electric signal when a predetermined deflection of the cathode ray tube display occurs. Alternatively said cathode ray tube display may have a mask surrounding the undeflected positions thereof whereby a signal produced by the photo-electric sensing means is interrupted on deflection of the display, or again, it may be arranged that the electron beam of the cathode ray tube reaches the display screen thereof only when the said beam is deflected.

In an alternative embodiment the indicating means includes switching means connected to each probe electrode and to an amplifier means which is connected to a cathode ray tube having a beam deflecting circuit and a tube display, whereby said switching means may select the potential induced at any one probe electrode to produce deflections on the tube display representative of the non-uniformity of the thickness of the material detected by any one of the probe electrodes.

Additional amplifier means may be connected in series with each probe electrode, said screening electrode being connected to the output of the said additional amplifier means.

The invention is illustrated, by way of example only, in the accompanying drawings, in which:

FIG. 3 is an end elevation in the direction of arrow C showing the circuit arrangement of part of the apparatus;

Figure 1:
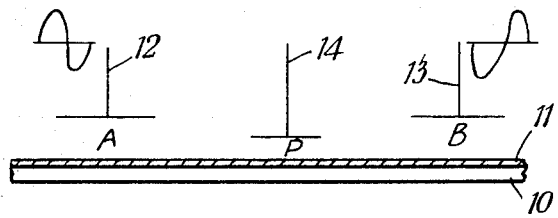
FIG. 1 is a diagrammatic view of an elementary apparatus according to the invention.

Referring to the drawings, FIG. 1 is a sectional view of a laminar substrate 10 such as a cellulose acetate film on which a layer 11 of electrically conductive material has been deposited. The layer 11 may be a fluid layer such as, for example, an aqueous layer of photographic emulsion. The electrical resistance of the coating 11 is inversely proportional to the coating thickness. When, therefore, a current is passed through the coating 11 in a direction perpendicular to its thickness, non-uniformities of thickness will give rise to irregularities in the potential gradient through the coating in the said direction. The principal of the present invention is to detect such irregularities of potential gradient.

For this purpose a pair of spaced apart drive electrodes 12, 13 are electrically coupled to the surface of the coating 11 at two respective positions A, B which are spaced apart in the direction perpendicular to the thickness to be tested and a probe electrode 14 is similarly mounted at a position P which is intermediate the said two positions A, B. Equal alternating potentials of opposite phase are applied to the drive electrodes 12, 13, inducing an alternating current in the coating 11 perpendicular to the thickness thereof. An alternating current in the coating 11 at the intermediate position P will induce in the probe 14 an alternating potential. If the position P is exactly midway between A and B then, provided the amplitudes of the two drive potentials applied to the electrodes 12, 13 are equal, a "null" condition is achieved, the probe electrode 14 remaining at zero potential so long as the coating resistances between A and P and B and P are equal—that is, so long as the coating 11 is of uniform thickness between A and B. Departure from uniformity of thickness between A and B causes a departure from the "null" condition, giving rise to an alternating potential at P and inducing a potential on the probe electrode 14.

By using rather high A.C. frequencies in the range of 100 kilocycles/sec. to 1 megacycle/sec. capacitive coupling between the electrodes 12, 13, 14 and the coating 11 may be employed, avoiding the necessity for physical contact with the coating 11. Typical photographic emulsion coatings have a resistance of 10,000 ohms per square in directions perpendicular to their thickness and the drive electrodes are typically a few inches in length and spaced a few inches apart. To make the coupling impedance to the coating 11 insignificant compared with the impedance of the coating 11 would therefore necessitate using with an electrode-to-coating gap of 1 cm. an A.C. frequency of several megacyclies/sec., a measure which would not be practicable due to the onset of the "skin" effect. By using the "null" method referred to above, however, the coupling impedance at the two drive electrodes 12, 13 effectively cancel each other.

Figure 2:
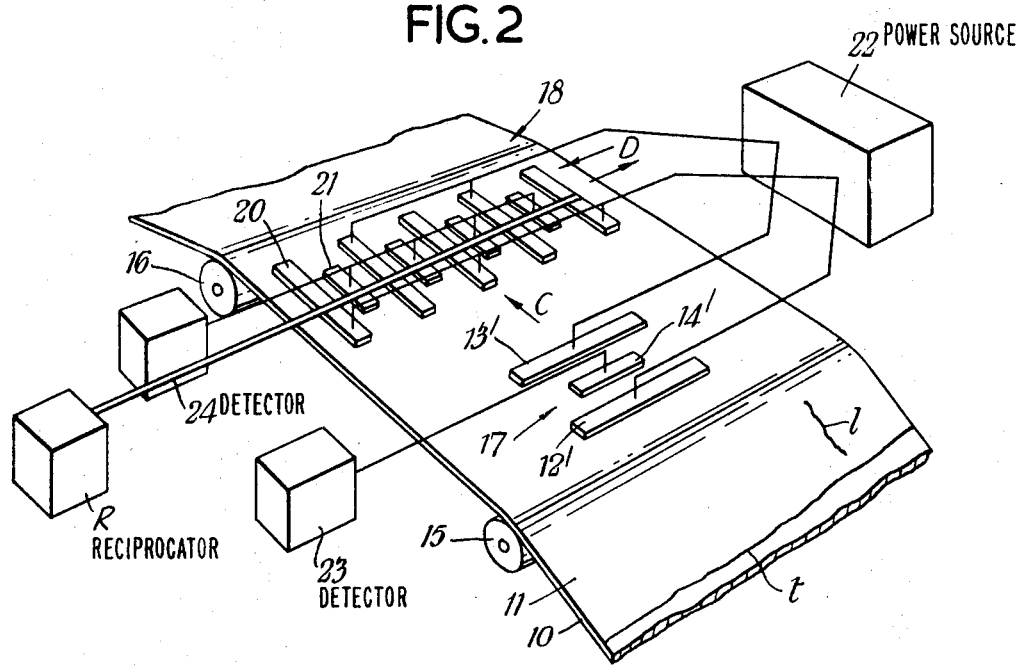
FIG. 2 is a general diagrammatic view of apparatus according to an embodiment of the invention.

An apparatus according to a preferred embodiment of the invention is illustrated diagrammatically in FIG. 2. The coated film 10 is mounted on guide rollers 15, 16 and is passed over the rollers 15, 16 continuously in the direction of arrow C. Between the rollers 15, 16 the film 10 passes in succession beneath a stationary electrode assembly 17 and a movable electrode array 18.

The stationary electrode assembly 17 comprises a pair of drive electrodes 12', 13' and an intermediate probe electrode 14' arranged in the same manner as the electrodes 12, 13, 14 of FIG. 1. The drive electrodes 12', 13' are elongated and extend parallel to one another in a direction perpendicular to the direction of travel C of the film 10, the probe electrode 14' also being elongated but having about three-quarters of the length of the drive electrodes 12', 13'. In order to produce a fairly uniform current density in the coating 11 between the drive electrodes 12', 13', each of the drive electrodes 12', 13' has a length equal to about twice the distance by which they are separated.

The movable electrode array 18 comprises a plurality of alternately sited drive electrodes 20 and probe electrodes 21, the array extending across substantially the entire width of the film 10. Each drive electrode 20 is elongated in the direction of travel C of the film 10 and extends for a length substantially equal to twice the distance between adjacent drive electrodes 20. The probe electrodes 21 are disposed midway between adjacent drive electrodes 20 and extend parallel to the drive electrodes, each probe electrode 21 being about three-quarters the length of a drive electrode 20. The electrode array 18 is mounted for reciprocating movement by means of reciprocator R in a direction at right angles to the direction of travel of the film 10, as shown by arrows D. Only five drive electrodes 20 are shown in FIG. 2 for clarity; in practice any convenient number can be employed.

The movable electrode array 18 is seen to constitute in effect a plurality of electrode assemblies of the kind shown in FIG. 1. Alternate drive electrodes 20 are connected to respective terminals of a source 22 of alternating potential which is adapted to supply equal alternating voltages of opposite phase to the respective alternating electrodes 20. The said terminals of the source 22 are also connected to the respective drive electrodes 12', 13' of the stationary electrode assembly 17. An inductance L' may connect each drive electrode to earth. The inductive L' is chosen so that it resonates with a capacity $C_D$ at a frequency of the applied alternating potential difference, thus reducing the current drawn from the alternating source. The respective probe electrodes 14', 21 are connected to respective detector units 23, 24. It will be appreciated by those skilled in the art that the detector units 23 and 24 detect the induced potential relative to a fixed potential such as ground potential. Thus, the return path through ground from the detector units has not been shown in the drawings. In addition, each probe electrode 21 may be provided with a respective screen electrode 21' adjacent the probe electrode and on the side remote from the film 10, said screen electrode being electrically connected to the respective probe electrode by current amplifier 33 (FIG. 5) having unit voltage gain. The purpose of the screen electrode 21' is to reduce the input capacitance of the probe electrode. Additionally the screen electrode will reduce the "noise" due to vibration of the film.

The stationary electrode assembly 17 and the movable electrode array 18 are arranged to detect non-uniformities in the film coating 11 which extend respectively across the width of the film 10 and lengthwise of the film 10. A transverse fault $t$ in the coating 11 extending across the width of the film 10 will induce a potential variation at the probe electrode 14' as it passes between the drive electrodes 12', 13' the variation being detected by the detector 23. Similarly, a longitudinal fault $l$ will cause a potential variation to be induced on one of the probe electrodes 21, the variation being detected by the detector 24.

It will be appreciated that there is an effective "blind spot" beneath each of the drive and probe electrodes at which is discontinuity in thickness of the coating 11 will not induce any change in the potential induced at the respective probe electrode. This is of no consequence so far as the stationary electrode assembly 17 is concerned, since the film 10 is moved continuously across the space separating the drive electrodes 12', 13', but it needs to be taken into account so far as the electrode array 18 is concerned it is for this reason that the array 18' is reciprocated. The amplitude of reciprocation is arranged to be at least half the distance between adjacent drive electrodes 20, and the speed of reciprocation is so coordinated with the speed of travel of the film 10 that all parts of the coating surface are located between two adjacent electrodes at some time in their travel beneath the eletcrode array 18.

The detector units 23, 24 may be of any known type depending on the type of indication required. Conveniently the detector unit (FIG. 3) includes an amplifier 25 which supplies an amplified signal to a beam deflecting circuit of a cathode ray tube 26. It can then be arranged that a spot in the cathode ray tube screen is displaced whenever a potential change indicating a fault is received by a probe electrode. In the case of detector unit 24, each probe electrode 21 may be connected in turn to the beam deflecting circuit. In this way a C.R.T. display consisting of a number of traces, each corresponding to a respective probe electrode 21, may be obtained, enabling the location of faults such as $l$ to be deduced.

A further advantage of reciprocating the array 18 is that the type of fault in the coating 11, as well as its location, may to some extent be deduced. Thus a continuous gradient in film thickness across the width of the film will cause a constant change in potential on one or other of the probe electrodes 21, resulting, for example in a constant displacement of the C.R.T. trace, while a line discontinuity or "downline" such as $l$ will cause an alternating change in potential on one or other of the probe electrodes 21, leading to a modulated displacement of the C.R.T. trace.

The electron beam in the cathode ray tube 26 may be intensity modulated by means of beam modulating pulses applied from a pulse generator 32 in synchronism with the A.C. voltage applied to the drive electrodes, the phase of the modulation being such that, when the coating 11 is uniform, the electron beam is intensified as the alternating beam deflecting voltage, if any, passes through zero.

The display on the screen of the cathode ray tube may be recorded continuously on photosensitive film moving at right angles to the direction of deflection of the electron beam to produce a continuous record of the uniformities of coating 11.

A photo-electric sensing device 27 of known type may be provided to "view" the screen of the cathode ray tube 26. It may be arranged, for example by the use of suitable screen masking M, that a luminous trace or spot is "seen" by the photo-electric sensing device 27 only when it is deflected by a predetermined amount. The device 27 may be connected in a relay circuit so that, on sensing a deflection in excess of said predetermined amount, a relay is operated to actuate a warning device. Conversely, it may of course be arranged that the photoelectric sensing device 27 "views" the undeflected C.R.T. trace or spot, said trace or spot passing out of the field of view of the device 27 on deflection by more than a predetermined amount: interruption of the signal received by the photo-electric sensing device 27 could then be arranged to actuate a warning device, or again, the cathode ray tube 26 may include means for ensuring that the electron beam reaches the fluorescent screen only when deflected by more than said predetermined amount.

Figure 4:
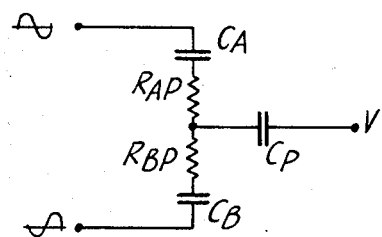
FIG. 4 is an equivalent circuit of an electrode assembly.

Measures are preferably taken to avoid or minimise the adverse effects of spurious movements of the film 10, such as vibrations, which give rise to changes in the electrical coupling between the electrodes and the coating 11. The equivalent circuit of an electrode assembly such as that of FIG. 1 is shown in FIG. 4. The drive electrode coupling capacitances $C_A$, $C_B$ are electrically in series with the coating resistances $R_{AP}$, $R_{BP}$ between positions A, P and B, P respectively. The potential $V_P$ picked up at the probe electrode 14 through its coupling capacitance $C_P$ is modified by spurious variations in either $C_A$ or $C_B$, causing a noise signal to be superimposed on any signal due to potential gradient variations.

One method of minimising noise due to film vibrations is to employ double drive electrodes of the type shown in FIG. 3. Each drive electrode 20 is electrically connected to a respective supplementary drive electrode 20' disposed on the other side of the film 10. Vibration of the film 10 in the direction of its thickness produces little change in the coupling capacities between the double drive electrode 20, 20' and the coating 11. Noise is reduced in this way by a factor of the order of 10 for vibrations of about 1 mm. amplitude.

An alternative (or additional) method of reducing noise is to employ phase sensitive detection in conjunction with the detector units 23, 24. One method of such phase sensitive detection employs the amplifier 25, cathode ray tube 26 and pulse generator 32, as shown in FIG. 3. Potential variations due to changes in the coupling capacitances $C_A$, $C_B$ (i.e. noise) are in phase quadrature with variations due to changes in the coating resistances $R_{AP}$, $R_{BP}$ (due to thickness variations); consequently the latter variations may be detected and amplified in preference to the former by use of known phase detection techniques.

Reciprocation of the movable array 18 causes an "edge effect" in respect of the outermost drive electrodes 20 of the array. To overcome this effect, the array 18 may be terminated at each extreme by additional electrodes 28 which are connected to earth through an inductance L. The inductance L is so chosen that it forms with the coupling capacitance $C_E$ of the additional electrode 28 a series resonant circuit at the A.C. frequency. This results in the coating 11 directly under the additional electrode 28 being held effectively at earth potential so that the extreme drive electrodes 20 are substantially unaffected by changes in relative position of the coating 11 due to reciprocation of the array 18.

The method of edge effect compensation described above has two disadvantages:

(i) The optimum value of the inductance L is critical.
(ii) Small changes in the coupling capacitance $C_E$ upset the resonance point and therefore the compensating effect.

Figure 5:
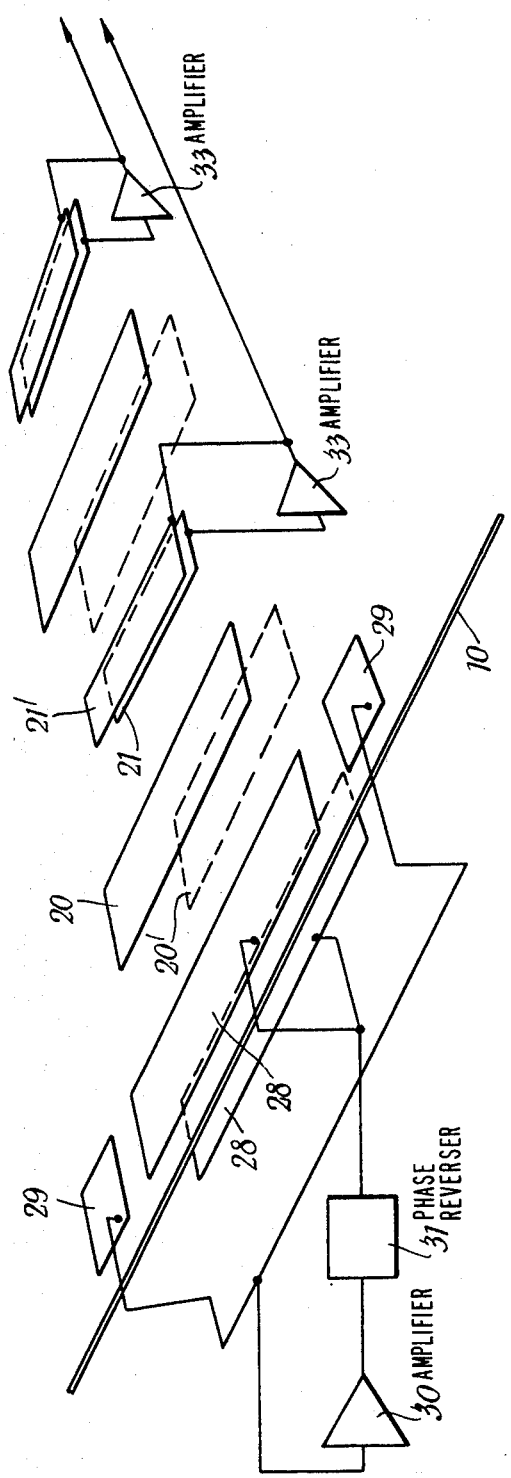
FIG. 5 is a modification of a part of the circuit arrangement shown in FIG. 3.

In FIG. 5 there is shown an alternative method of compensation for the edge effect which is to measure the potential of the coating 11 at the position of the additional electrodes 28 by means of auxiliary probe electrodes 29. This potential, after amplification in amplifier 30 and phase reversal by phase reverser 31, is applied to the additional electrodes 28. A closed loop system is thus formed serving to maintain very close to earth potential that part of the coating opposite the additional electrodes 28.

Figure 6:
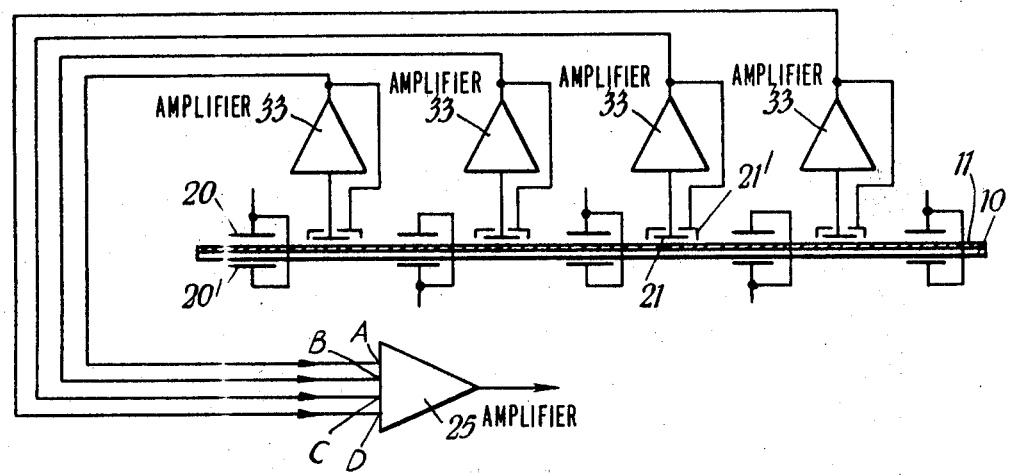
FIG. 6 is a circuit arrangement of part of the apparatus shown in FIG. 3.

In FIG. 6 there is shown the circuit arrangement of the screen electrodes 21' and probe electrodes 21 in greater detail than shown in FIGS. 3 and 5. A current amplifier 33 is connected in series with each probe electrode 21, the screen electrode 21' being connected to the output of the current amplifier 33.

The outputs A, B, C, D, from each current amplifier 33 may be fed simultaneously to a common amplifier 25 as shown in FIG. 6 the output of said common amplifier being connected to an indicating means, e.g. a cathode ray tube as shown at 26 in FIG. 3.

Figure 7:
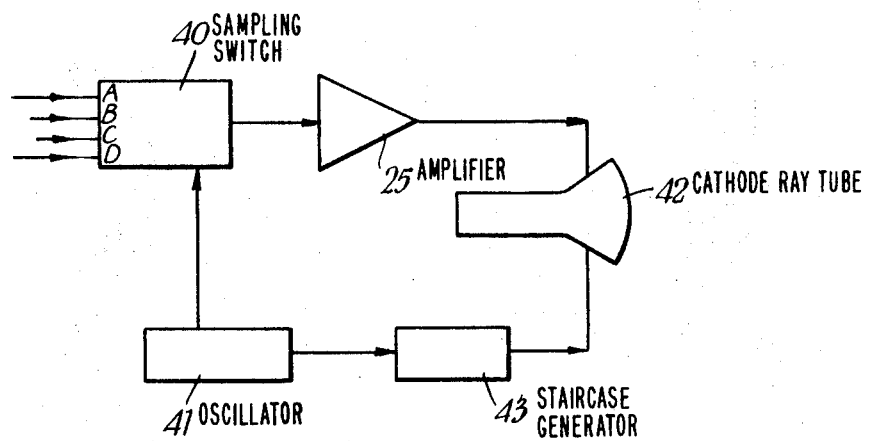
FIG. 7 is an alternative circuit arrangement to that shown in FIG. 6.

Alternatively the outputs A, B, C, D, from each current amplifier 33 may be fed to a sampling switch 40 controlled by a synchronising oscillator 41 as shown in FIG. 7. The signal is fed from the sampling switch 40 to the amplifier 25. The signal from the amplifier 25 is fed to a cathode ray tube 42 as is the signal from the synchronising oscillator 41 via a staircase generator 43.

By using the arrangement shown in FIG. 7 the output from each probe electrode 21 may be investigated separately, thus enabling a fault in the coating to be located more accurately.

We claim:

1. Apparatus for testing laminar material being conductive of electricity through at least a part of the thickness thereof comprising a pair of drive electrodes disposed at two positions which are spaced apart on one side of the plane of the laminar material, said drive electrodes extending substantially perpendicularly to the direction of travel of the material, means for mounting said laminar material adjacent said drive electrodes and for moving the laminar material continuously relative to said drive electrodes, means for applying equal alternating potentials of opposite phase to said drive electrodes in a manner as to induce an alternating electric potential in the surface of the material parallel to the plane thereof between said two positions, a probe electrode disposed at a position intermediate of, parallel to and spaced apart in the plane of and on the same side of the material from said two positions and responsive to the electric potential in the material at said intermediate position and indicating means connected to the probe electrode whereby said changes in the alternating potential provide an indication of the presence of thickness irregularities of said material between said two spaced apart positions.

2. Apparatus as claimed in claim 1 in which support means are provided, said drive electrodes and the probe electrode being fixed to said support means.

3. Apparatus as claimed in claim 1 in which the drive electrodes are elongated and parallel to each other, each having a length greater than the distance separating them.

4. Apparatus as claimed in claim 1 in which an inductance connects each drive electrode to earth, therebeing an inherent capacitance between each of said drive electrodes and earth, said inductance being so chosen that it resonates with the capacitance between the said electrode and earth at the frequency of the applied alternating potential difference.

5. Apparatus as claimed in claim 1 in which the means for reciprocating the electrodes in operation, reciprocates the electrodes with an amplitude substantially equal to half the separation of the drive electrodes.

6. Apparatus as claimed in claim 1 comprising a first set of drive and probe electrodes extending substantially transverse to the direction of travel of the material and responsive to irregularities of thickness extending transverse to said direction of travel and at least one second set of drive and probe electrodes extending substantially longitudinally to the direction of travel of the material and mounted for reciprocating movement in a direction transverse to said direction of travel and responsive to irregularities of thickness extending longitudinally to the direction of movement of the material.

7. Apparatus as claimed in claim 6 in which the indicating means includes switching means connected to each probe electrode and to an amplifier means which is connected to a cathode ray tube having a beam deflecting circuit and a tube display, whereby said switching means may select the potential induced by any one probe electrode to produce deflections on the tube display representative of the non-uniformity of the thickness of the material detected by any one of the said probe electrodes.

8. Apparatus as claimed in claim 1 including an electrode array comprising a plurality of adjacent pairs of said parallel drive electrodes, and a plurality of said probe electrodes with one probe electrode being disposed between each respective pair of drive electrodes, and alternate drive electrodes being connected together.

9. Apparatus as claimed in claim 1 in which a screening electrode is disposed adjacent each probe electrode on the side of said probe electrode remote from the laminar material and means are provided for applying to each screen electrode an alternating potential which is substantially equal in phase and magnitude to the potential induced in the respective probe electrode by the laminar material.

10. Apparatus as claimed in claim 1 in which each drive electrode comprises two electrically connected parallel plates adapted to be disposed on opposite sides of the material.

11. Apparatus as claimed in claim 1 in which a phase-sensitive detector is provided and each probe electrode is connected to said phase-sensitive detector, the latter being sensitive to changes in the alternating potential of said probe due to non-uniformity of thickness of the material.

12. Apparatus as claimed in claim 1 in which the indicating means includes amplifier means, a cathode ray tube having a beam-deflecting circuit and a tube display, and means connecting each probe electrode to said beam-deflecting circuit to produce deflections on the tube display representative of the non-uniformity of the thickness of the material.

13. Apparatus according to claim 12 including photo-electric sensing means responsive to the cathode ray tube display and which are adapted to produce an electric signal when a predetermined deflection of the cathode ray tube display occurs.

14. Apparatus according to claim 12 including a mask surrounding the undeflected positions of the cathode ray tube whereby a signal produced by the photo-electric sensing means is interrupted on deflection of said display from said undeflected positions.

15. Apparatus for testing laminar material conductive of electricity through at least a part of the thickness thereof comprising a plurality of pairs of drive electrodes all disposed on one side of the laminar material, each drive electrode being spaced apart and extending substantially parallel to the direction of travel of the laminar material, means for mounting said laminar material adjacent said drive electrodes and for moving the laminar material continuously relative to the drive electrodes, means connecting alternate sets of drive electrodes together, means for applying equal alternating potentials of opposite phase to said alternate sets of drive electrodes in a manner as to induce an alternating electric potential in the surface of the laminar material parallel to the plane thereof between said pairs of drive electrodes, a plurality of probe electrodes with one probe electrode being disposed between each said respective pair of drive electrodes, said probe electrodes being parallel to and on the same side of the laminar material as said drive electrodes, each said probe electrode being responsive to the electric potential of the material at an intermediate position between the pair of drive electrodes associated therewith, means electrically connecting the probe electrodes together, means for reciprocating the electrodes relative to and perpendicular to the direction of travel of the laminar material, indicating means connected to the probe electrodes such that when there is no irregularity in thickness of material extending parallel to the direction of travel of the material and between a pair of drive electrodes there is substantially no electric potential at the respective intermediate position between each said pair of drive electrodes and when there is an irregularity in thickness of the material extending parallel to the direction of travel of the material and between a pair of drive electrodes there is produced an electric potential at the respective intermediate position between said pair of drive electrodes which is detected by the respective probe electrode and said indicating means indicates the presence of said irregularity, an additional electrode at each end of said plurality of pairs of drive electrodes, means adapted to capacitively couple said additional electrodes to earth potential and additional means for electrically coupling said additional electrodes to the said material in a manner as to prevent reciprocation of said electrode from affecting the electric potential detected by said probe electrodes.

16. Apparatus as claimed in claim 15 in which said means adapted to capacitively couple said additional electrodes to earth potential is an inductance, said inductance having an impedance at the frequency of the applied alternating potentials which is substantially equal to the impedance of the means for electrically coupling said additional electrodes to said material.

17. Apparatus as claimed in claim 15 in which auxiliary probe electrodes are disposed in a plane parallel to the material and a phase-inverting voltage amplifier is provided, an impedance for connecting the output of said voltage amplifier to earth potential, and the input of the voltage amplifier being connected to the auxiliary probe electrodes which are disposed to respond to alternating potentials induced in that part of the material opposite said additional electrodes, and the output of the voltage amplifier being connected to the additional electrodes.

18. Apparatus as claimed in claim 17 in which amplifier means are connected in series with the probe electrode, said screening electrode being connected to the output of the said amplifier means.

References Cited

UNITED STATES PATENTS

| 2,160,540 | 5/1939 | Drake | 324—64 X |
| 2,222,221 | 11/1940 | Burford | 324—61 |
| 2,231,035 | 2/1941 | Stevens et al. | 324—61 |
| 3,009,101 | 11/1961 | Locher | 324—61 |
| 3,339,137 | 8/1967 | Perry | 324—61 |
| 1,984,166 | 11/1934 | Walter | 324—61 |
| 2,829,340 | 4/1958 | Lippke | 324—61 |
| 2,950,436 | 8/1960 | Butticaz et al. | 324—61 |
| 2,958,818 | 11/1960 | Cowan et al. | 324—37 |
| 2,991,419 | 4/1961 | Nilsson | 324—121 |
| 3,078,709 | 2/1963 | Clark | 73—53 |
| 3,221,171 | 11/1965 | Locher | 324—61 X |
| 3,354,388 | 11/1967 | Perry | 324—65 |
| 3,355,664 | 11/1967 | Pranke | 324—61 |
| 3,391,337 | 7/1968 | Preikschat | 324—61 |

FOREIGN PATENTS 511,167 10/1930 Germany.

OTHER REFERENCES

Syunzo, Japanese printed publication No. 19,050/63, Pub. Sept. 20, 1963 (2 pp. spec.).

EDWARD E. KUBASIEWICZ, Primary Examiner

U.S. Cl. X.R.

324—121